United States Patent [19]

Dumont

[11] Patent Number: 5,584,362
[45] Date of Patent: Dec. 17, 1996

[54] CHECK-OUT AND BAGGING STATION AND METHOD

[76] Inventor: Charles Dumont, 8925 Collins Ave., Surfside, Fla. 33154

[21] Appl. No.: 419,430

[22] Filed: Apr. 10, 1995

Related U.S. Application Data

[63] Continuation-in-part of Ser. No. 328,683, Oct. 25, 1994.

[51] Int. Cl.$^6$ .................................................. A47F 9/04
[52] U.S. Cl. ................................ 186/61; 186/66; 235/383
[58] Field of Search ..................... 186/61, 66; 235/383; 340/572

[56] References Cited

U.S. PATENT DOCUMENTS

| | | | |
|---|---|---|---|
| 4,071,740 | 1/1978 | Gogulski | 186/61 X |
| 4,692,747 | 9/1987 | Wolf | 340/572 |
| 4,909,356 | 3/1990 | Rimondi et al. | 186/61 |
| 4,912,906 | 4/1990 | Toner | 53/463 |
| 4,929,928 | 5/1990 | Hultiker | 340/572 |
| 4,964,053 | 10/1990 | Humble | 364/466 |
| 5,151,684 | 9/1992 | Johnsen | 340/572 |
| 5,170,045 | 12/1992 | Bengtsson | 235/462 |
| 5,174,413 | 12/1992 | Cappi et al. | 186/66 |
| 5,252,814 | 10/1993 | Tooley | 186/61 X |
| 5,304,786 | 4/1994 | Pavlidis et al. | 235/462 |
| 5,316,107 | 5/1994 | Wieschemann et al. | 186/61 |
| 5,340,970 | 8/1994 | Wolfe, Jr. et al. | 235/383 |
| 5,412,193 | 5/1995 | Swartz et al. | 186/61 X |
| 5,418,354 | 5/1995 | Halling et al. | 235/383 |

*Primary Examiner*—F. J. Bartuska
*Attorney, Agent, or Firm*—Oltman Flynn & Kubler

[57] ABSTRACT

A customer checkout apparatus for recording the prices of purchase items where the purchase items each have an item information display mechanism for storing purchase item data including purchase item price in machine readable form includes an item check-out vessel for receiving each of the purchase items, and for checking each purchase item, the vessel including a vessel wall and an item receiving door for opening to admit a given purchase item into the vessel and for closing to secure the item against tampering during item check-out, a purchase item display mechanism scanning device for reading item data from the information display mechanism on each item upon closing of the item receiving door, and a microprocessor for receiving and processing and storing data scanned by the display mechanism scanning device. A method of using the apparatus is also provided, and includes the steps of placing the purchase item and the attached information display mechanism into the check-out vessel, closing the item receiving door, scanning the information display mechanism, and releasing the item from the vessel.

15 Claims, 5 Drawing Sheets

CHECK-OUT AND BAGGING STATION AND METHOD

FILING HISTORY

This application is a continuation-in-part of application Ser. No. 08/328,683 filed on Oct. 25, 1994.

BACKGROUND OF THE INVENTION

1. Field of the Invention

The present invention relates generally to the field of purchase item check-out devices and systems. More specifically, the present invention relates to a customer check-out apparatus including an item check-out vessel for receiving a purchase item having an item information display means and for processing the item for purchase. The information display means stores the item price in machine readable form for check-out. The display means preferably also triggers a store exit alarm if passed through a conventional store exit sensor without first being processed for purchase in the check-out vessel. The check-out vessel includes an item receiving door which is opened to admit the given purchase item and is closed to begin a check-out procedure. The vessel includes an information display scanning device for reading the price and any other item data stored in the given information display means after the item receiving door is closed. A microprocessor processes and stores the scanned data for each item in each transaction. Then the display scanning device preferably deactivates, deletes or replaces data stored in the display means, or removes the display means altogether, so that the purchase item may be taken through the store exit alarm without activating the exit alarm. The apparatus preferably includes a check-out table containing automatic purchase item bagging means, a customer self-checkout system such as with a credit card, and means for switching the apparatus from an automatic customer self-checkout mode to a store employee controlled checkout mode.

2. Description of the Prior Art

There have recently been several check-out purchase item processing devices which are intended to provide security during item check-out. These devices have generally not been equipped to automatically bag or bar code scan purchase items, and not equipped to reliably and conveniently secure the purchase items against theft or price tag switching. These devices have also generally been unduly bulky and expensive to manufacture and maintain.

Such prior devices include Humble, U.S. Pat. No. 4,964,053, issued on Oct. 16, 1990, which teaches an apparatus for self-checkout of produce items. Humble processes both UPC identified articles and non-coded articles such as produce. Humble is bulky and expensive.

Wolf, U.S. Pat. No. 4,692,747, issued on Sep. 8, 1987, discloses an article security system. A customer selects purchase items and places them at one end of a check-out aisle. The customer proceeds along a path separated from the item path to prevent customer contact with the items during check-out. The customer path is equipped with an electronic surveillance system which sounds an alarm if the customer passes through it with a tagged item. A problem with Wolf is that the various aisles and customer barricades necessarily occupy considerable floor space which might more profitably be used to display merchandise. Another problem is that a system as elaborate as Wolf would be costly as well.

Rimondi, et al., U.S. Pat. No. 4,909,356, issued on Mar. 20, 1990, reveals a self-service check-out counter. The Rimondi, et al. counter incorporates an integral apparatus for on-demand manufacturing of custom-sized bags conforming to the volume of articles received in the bags. A counter having a data entry keyboard is provided at which the customer individually scans purchase items, and then the customer places the items into a bag-forming apparatus. A bag is formed corresponding to the size and weight parameters of the various purchase items, this data being entered by the customer on the keyboard. Devices are also provided for preventing pilferage, fraud and inadvertent errors. A problem with Rimondi, et al. is that the counter apparatus is once again bulky and expensive. Another problem is that the customer must manually preform each primary function, such as scanning, bagging and data entry, making for customer inconvenience and slow check-out lines.

Toner, U.S. Pat. No. 4,912,906, issued on Apr. 3, 1990, teaches an automatic bag system for a supermarket check-out counter. Sheet plastic is fed into an open top of a purchase item loading compartment located next to a conventional item scanner in a check-out counter. Purchase items are loaded into the compartment above the plastic sheeting and the sheeting is urged inwardly within the loading compartment to assume the shape of the contained items. Then edges of the sheeting are heated to bond together into a sealed purchase item bag. Problems with Toner are that the bagging system does nothing to prevent customer tampering of items during checking, and self-checkout is apparently not provided.

Hultaker, U.S. Pat. No. 4,929,928, issued on May 29, 1990, discloses a magnetized ink, paint or dye used on purchase items to prevent theft. The ink to be applied on the purchase items is mixed with magnetized particles which sound an alarm if carried through a store exit sensor. The particles are demagnetized upon item checking and customer payment. A problem with Hultaker is that the magnetic ink does not prevent the customer from switching item price tags during or prior to check-out. Another problem with Hultaker is that customer self-checkout is apparently not possible, since an employee must verify that payment is made before demagnetizing the ink.

Johnsen, U.S. Pat. No. 5,151,684, issued on Sep. 29, 1992, reveals an electronic inventory label and security apparatus. Johnsen is provides item data storage tags which are secured to purchase items with connecting members. The tags have item data including price, accounting and inventory control data stored on them in machine readable form, and include item security means. Unauthorized removal of a tag sounds an alarm. A problem with Johnsen is that a customer might conceivably shuffle purchase items during check-out so that the tag for a less expensive item is read while an expensive item is released for removal.

Bengtsson, U.S. Pat. No. 5,170,045, issued on Dec. 8, 1992, teaches a price tag deactivator, where the tags include bar codes and alarm activating magnetic strips. Bengtsson includes several rows of permanent magnets disposed in a plane substantially parallel with the plane in which the tag bar code on a purchase item is located. The magnetic poles bring about tag deactivation. A problem with Bengtsson is that no workable provision is made to prevent purchase item switching or tag tampering before or during check-out.

Pavlidis, et al., U.S. Pat. No. 5,304,786, issued on Apr. 19, 1994, reveals a high density two-dimensional bar code symbol. A nonvolatile electro-optical read-only memory includes a substrate on which is printed a complex symbol with a high density two-dimensional configuration. Component symbols or codewords are provided in alternating rows. A problem with Pavlidis, et al., is that, while it provides a data storage function, it lacks any significant purchase item security function.

Wieschemann, et al., U.S. Pat. No. 5,316,107, issued on May 31, 1994, discloses a device for checking out purchase items. Wieschemann, et al., includes a check-out apparatus which checks items automatically or manually as the items are presented to the apparatus. Problems with Wieschemann, et al., are that self-checkout is not provided, and item security against tampering during check-out is minimal.

Wolfe, Jr., et al., U.S. Pat. No. 5,340,970, issued on Aug. 23, 1994 teaches an purchase item check-out system with security parameter override capacity. The Wolfe, Jr., et al. apparatus is intended to automatically check out purchase items bearing an identification code. The apparatus includes a code reader generating output signals indicative of the article identification codes, a sensor generating output signal indicative of measurable item characteristics, a memory for storage for each of the articles, an article rejector and various other item processing elements. Problems with Wolfe, Jr., et al., are that it is complex, expensive and cumbersome.

It is thus an object of the present invention to provide a check-out station apparatus which automatically checks out purchase items inserted into it by a customer and which prevents the customer from switching items which have been purchased with items which have not been purchased.

It is another object of the present invention to provide such an apparatus which can process for check-out items fitted with special alarm or dye-loaded item data tags, which reads and optionally disarms and removes such tags.

It is still another object of the present invention to provide such an apparatus which is suitable for both store employee operated check-out and for customer self-checkout and which is easy for an average customer to understand and use.

It is still another object of the present invention to provide such an apparatus which includes a check-out table containing automatic purchase item bagging means, a customer self-checkout system such as with a credit card, and means for switching the apparatus from an automatic customer self-checkout mode to a store employee controlled checkout mode.

It is finally an object of the present invention to provide such an apparatus which is relatively simple in design and inexpensive to manufacture.

SUMMARY OF THE INVENTION

The present invention accomplishes the above-stated objectives, as well as others, as may be determined by a fair reading and interpretation of the entire specification.

A customer checkout apparatus is provided for recording the prices of purchase items where the purchase items each have an item information display mechanism for storing purchase item data including purchase item price, in machine readable form. The apparatus includes an item check-out vessel for receiving each of the purchase items, and for checking each purchase item, the vessel including a vessel wall and an item receiving door for opening to admit a given purchase item into the vessel and for closing to secure the item against tampering during item check-out, a purchase item display mechanism scanning device for reading item data from the information display mechanism on each item upon closing of the item receiving door, and a microprocessor for receiving and processing and storing data scanned by the display mechanism scanning device. Where the purchase item includes an exit alarm triggering mechanism for activating a store exit alarm if not checked, and the display mechanism scanning device includes a mechanism for deactivating the exit alarm triggering mechanism upon reading the item data. The display mechanism scanning device preferably includes a mechanism for replacing item data deleted from the information display mechanism. The vessel preferably additionally includes a mechanism for removing the display mechanism from each item during check-out. The vessel preferably includes a lock assembly for locking the item receiving door for preventing a customer from switching purchase items during checkout. The apparatus preferably additionally includes a multiple vessel alarm for detecting the introduction of more than one purchase item into the vessel at a time. The vessel might also include means for detecting items with tags which have not been previously introduced into the display scanning device or items having bar codes which have not been exposed to the scanner, the detection being made either with the vessel alarm system or with a vessel item weighing scale. The apparatus preferably additionally includes an item releasing door for releasing a purchase item from the vessel after scanning of the display mechanism. The apparatus preferably additionally includes a shopping bag and shopping bag retaining mechanism beneath the vessel for receiving items released from the vessel through the item releasing door. A mechanism is preferably additionally provided for sealing the shopping bag. The information display mechanism preferably includes a data tag having a tag body and including a data retaining mechanism, an elongate item engaging member for securing the tag to one of the purchase items, and the display mechanism scanning device preferably includes a tag receiving slot in the vessel wall for receiving and retaining the tag during scanning of the data retaining mechanism. The purchase item display scanning device preferably includes a mechanism for detaching the tag from the item. The apparatus preferably additionally includes a check-out table, the check-out table including a table top surface area having table top edges, onto which the vessel is secured, and a table top area adjacent to the vessel on which the items are placed while awaiting check-out.

The vessel alternatively retains several of the purchase items simultaneously, and in this instance the apparatus includes several of the purchase item display mechanism scanning devices for reading item data from the information display mechanisms of several purchase items substantially simultaneously upon closing of the item receiving door. The apparatus may additionally include a mechanism for receiving and recording customer payments prior to release of checked purchase items.

A method of using the above-described apparatus is also provided, and includes the steps of placing the purchase item and the attached information display mechanism into the check-out vessel, closing the item receiving door, scanning the information display mechanism, and releasing the item from the vessel.

A customer check-out apparatus is provided for recording the price of a purchase item where the purchase item has an item information display mechanism for storing purchase item data including purchase item price in machine readable form, including an item check-out vessel for receiving the purchase item, the vessel including a vessel wall and an item receiving opening for admitting the purchase item into the vessel, a purchase item display mechanism scanning mechanism for reading the purchase item data from the information display mechanism on the purchase item. The information display mechanism scanning device optionally includes an X-ray, ultrasound or microwave generation device for scanning the information display mechanism.

A portable customer check-out apparatus is also provided for recording the prices of purchase items where the purchase items each have an item information display mechanism for storing purchase item data including purchase item price in machine readable form, including a portable item check-out assembly for checking each of the purchase items, the assembly including an assembly wall, and a purchase item display mechanisim scanning device for reading item data from the information display mechanism on each item. The information display mechanism preferably includes a data tag having a tag body and including a data retaining mechanism, an elongate item engaging member for securing the tag to one of the purchase items, and where the display mechanism scanning device includes a tag receiving slot in the assembly wall for receiving and retaining the tag during scanning of the data retaining mechanism.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a customer checkout apparatus 10 is disclosed, for either customer self check-out or for conventional store employee operated check-out. Apparatus 10 includes an item check-out vessel 12 for receiving a purchase item 14 having an item information display means 16, and for processing the item 14 for purchase. Information display means 16 is scanned only while display means 16 and item 14 are contained within vessel 12.

Display means 16 stores the item 14 price and any other desired item 14 data in machine readable form for check-out. Display means 16 preferably contains exit alarm triggering means (not shown) for activating a store exit alarm if passed through a conventional store exit sensor (not shown) without first being processed for purchase in check-out vessel 12.

Check-out vessel 12 preferably includes an item receiving door 22 which is opened to admit a given purchase item 14 into vessel 12 and which is then closed to begin item check-out. Vessel 12 includes a purchase item 14 display scanning device 30 for reading the price and any other item 14 data stored in the given information display means 16, after item receiving door 22 is closed. A micro-processor 24 processes and stores data for each check-out transaction. Then display scanning device 30 preferably deactivates, deletes or replaces data stored in display means 16, or removes the display means 16 altogether, so that purchase item 14 may be taken through the store exit sensor without activating the exit alarm.

Item receiving door 22 is preferably provided with locking means so that once item receiving door 22 is closed by a customer, it locks automatically to prevent the customer from switching items 14 during check-out. One version of vessel 12 is intended to receive only one item 14 at a time, and this version preferably includes a vessel sensing and alarm means 32 for detecting the introduction of more than one purchase item 14 at a time into vessel 12. Another version of vessel 12 is intended to receive multiple items 14 at one time, and does not include such an alarm. For this other version alarm means 32 will be activated if an item is introduced inside vessel 12 without its display means 16 such as its bar code 44 having been previously read by either slot 54 or scanner 30. Alarm means 32 may simply activate a voice recording advising the customer that multiple items 14 are in vessel 12 while preventing check-out until the number of items 14 within vessel 12 is reduced to one.

Check-out vessel 12 also preferably includes an item releasing door 34 in the bottom of vessel 12 which slides or hinges open automatically to drop each checked item 14 into a shopping bag 36. Item releasing door 34 preferably includes a scale for weighing items 14 which is incorporated into scanning device 30. Shopping bags 36 are preferably delivered automatically, one by one into position by a bagging mechanism 38 located beneath releasing door 36, as illustrated in U.S. patent application Ser. No. 08/241,354, now U.S. Pat. No. 5,437,346 FIGS. 2 and 3. The information scanned from the display means 16 attached to each item 14 preferably includes data indicating item 14 weight, size and shape, so that micro-processor 24 can determine when each shopping bag 36 is full, seal the bag 36, eject the sealed bag 36, and present and open a fresh bag 36 automatically. Shopping bags 36 are sealed before the customer is given access to them and after payment is effected so that the contents of bags 36 cannot be changed after check-out without conspicuously tearing bags 36 open.

Information display means 16 preferably takes the form of an inventive tag 40 having a tag body 42 in the form of a flat, rectangular shell and containing a bar code 44 and/or a magnetic strip 46 and/or a micro-chip 48 for retaining item 14 data. See FIGS. 2 and 3. Reference is also made to applicant's co-pending patent application for a universal merchandise tag, Ser. No. 08/328,683 filed Oct. 25, 1994. The tag 40 also preferably includes a tag security mechanism including an elongate item engaging member 52 which either sounds an alarm 28 powered by a battery 26 or spoils the item 14 with dye if cut away from the item 14 by a customer. Item engaging member 52 may take either a loop configuration or the common "T" configuration. Control wires 64 for triggering means deactivation are provided within narrow, longitudinal passageways 66 in the tag body 42, the passageways 66 opening as inconspicuous small ports 68 in the end of tag body 42 opposite elongate item engaging member 52. Where such a tag 40 is used, scanning device 30 preferably includes a tag receiving slot 54 in an interior face 58 of a wall 56 of check-out vessel 12. Scanning apparatus 62 suitable for reading a bar code, magnetic strip or chip which is positioned adjacent slot 54 within or outside vessel wall 56. See FIG. 4. Scanning apparatus 62 preferably includes tag 40 security deactivation and tag removal means 60. Control wires 64 may also simply conduct electricity from deactivation means 60 to read the RAM chip. Alarm 28 could also be of the magnetic type, which does not require any power but operates on opposite polarity field. Battery 26 is not absolutely required but is an added self-powered accessory, and a high energy solar cell might be provided.

An elaborate version of tag 40 for more expensive purchase items 14 preferably includes a tag body 42 in the form of a hollow shell containing the purchase item information display means 16. For less expensive items 14, simpler versions of tag 40 include a tag body 42 in the form of a substantially solid panel, similar to a credit card. The panel tag body 42 is flat, and has either a bar code 44 only and/or a magnetic strip 46 only and/or a microprocessor RAM chip 48 only and/or a magnetic resonant alarm without a battery 26, and operates with a magnetic field. In the event a purchase item 14 is illegally taken out of a store with the tag 40 attached, the store exit alarm will be activated due to the passing of tag 40 magnetic field near an exit sensor. Should an item 14 be forcibly removed from a checkout vessel 12 during checkout, without the tag 40 having been placed into the tag receiving slot 54 or across the check-out scanner 30, an alarm is activated through the presence of the tag 40 magnetic field. The only way to remove a tagged item 14 from the store is to separate the tag 40 from the item 14 and to carry the item 14 out of the store. The item 14 would have to be hidden somewhere other than in a store shopping bag 36, since bags 36 are sealed at the check-out station 70. To prevent this type of theft, the item engaging member 52 for the simpler versions of tag 40 is preferably formed of a strong wire which only the tag removal means 60 can cut.

Check-out vessel 12 is preferably mounted on a check-out table 70. See FIGS. 5 and 6. Check-out table 70 includes a rectangular table top 72 on which vessel 12 is secured and a surface area 74 adjacent vessel 12 on which purchase items 14 selected by a customer are placed while awaiting check-out. One embodiment of table 70 is similar in design to a roll-top desk, having a back wall 82, side walls 84 and 86 extending upwardly from the edges of table top 72, and a top wall 88 connecting the top edges of side walls 84 and 86. See FIG. 5. A roll down security panel 90 is preferably provided for rolling along side wall tracks 92 and locking shut when apparatus 10 is not in use. Check-out table 70 includes table legs 94 extending downwardly from each corner of table top 72, and preferably includes an enclosed bagging chamber 100 beneath table top 72, formed of panels 98 connecting legs 94. An optional automatic bagging apparatus 38 is retained within bagging chamber 100, and chamber 100 has a bag releasing door 112 from which filled and sealed bags 36 are released. A cash register 110 is preferably provided. Legs 94 have lower ends 114 which are preferably fitted with wheels 116 for convenient apparatus 10 and check-out table 70 transport. Another embodiment of table 70 is illustrated in FIG. 6, which omits top wall 88 and additionally includes a cash register drawer 122, shelves 124 and a telephone 126.

Figure 1:
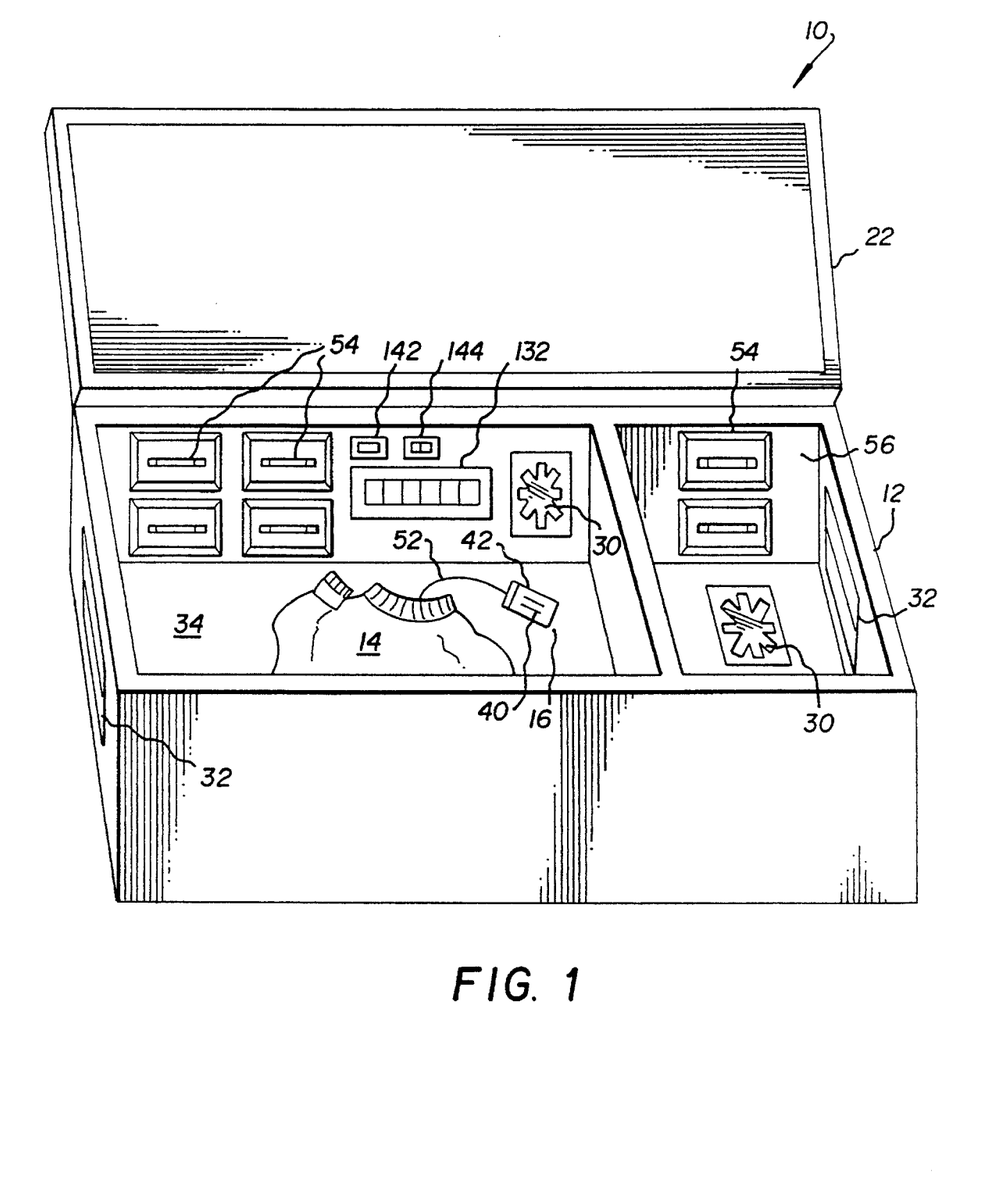
FIG. 1 is a perspective view of the inventive check-out vessel, shown with the item receiving door open, revealing multiple tag slots, laser scanners, vessel sensing and alarm means, a compartment divider, and alarm detectors. Not shown but preferably provided is a scale in the bottom of the vessel. Optional features not shown are microwave and ultrasound generators. In this illustration, the receiving door and releasing door both slide into open and closed positions along edge grooves.
Figure 2:
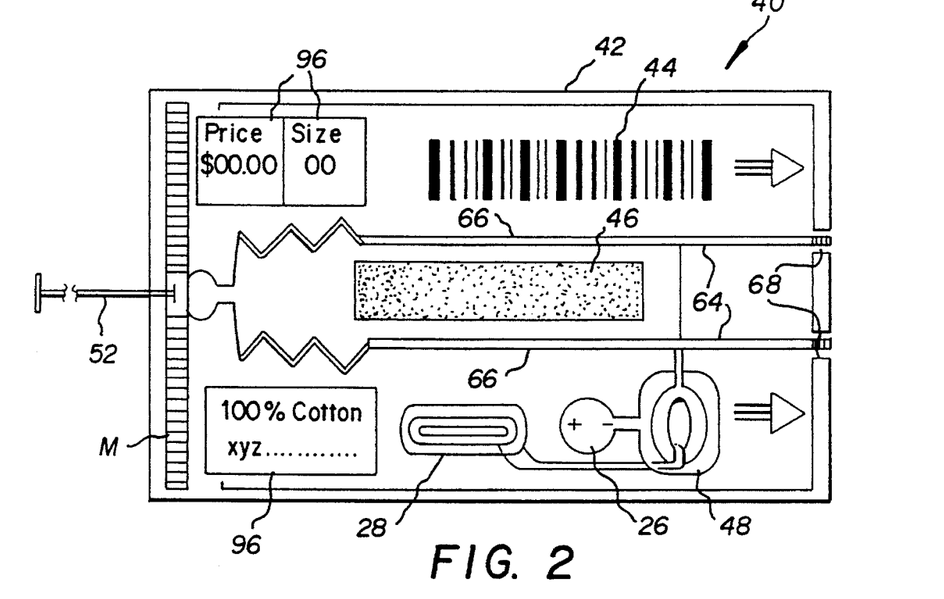
FIG. 2 is a cross-section, partly schematic view of one embodiment of the inventive item tag, revealing the T-shaped elongate item engaging member, three preferred alternative information display means in the form of a bar code, a magnetic strip and a computer RAM chip. Also shown are the control wires for deactivating the item security mechanism, which in this instance is an alarm. The engaging member is stapled to an electrically conductive attachment matrix M which is part of the electric alarm circuit. An engaging member cut away by the checking apparatus may be reconnected or replaced by a new engaging member stapled to the matrix, permitting tag re-use.
Figure 3:
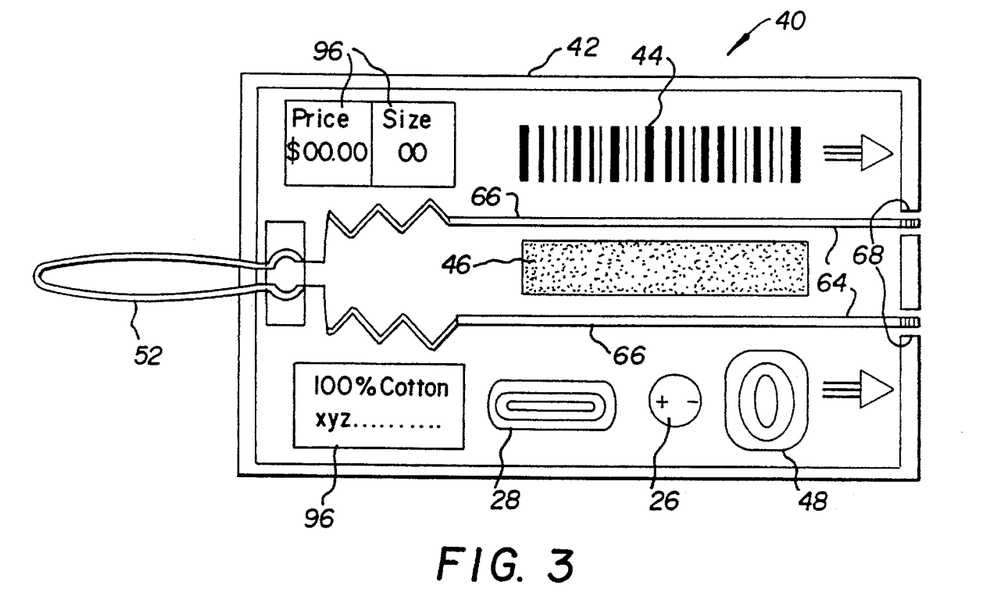
FIG. 3 is a cross-section, partly schematic view of another embodiment of the inventive item tag, revealing the tubular loop-shaped elongate item engaging member which contains a dye, three preferred alternative information display means in the form of a bar code, a magnetic strip and a computer RAM chip. Also shown are the control wires for deactivating the item security mechanism, which in this instance is a pressurized dye. Deactivation of the mechanism causes the dye be drawn out of the engaging member and into an evacuated compartment within the tag. The compartment may have dye-absorbing walls, and a check valve may also prevent the escape of the dye from the compartment.
Figure 4:
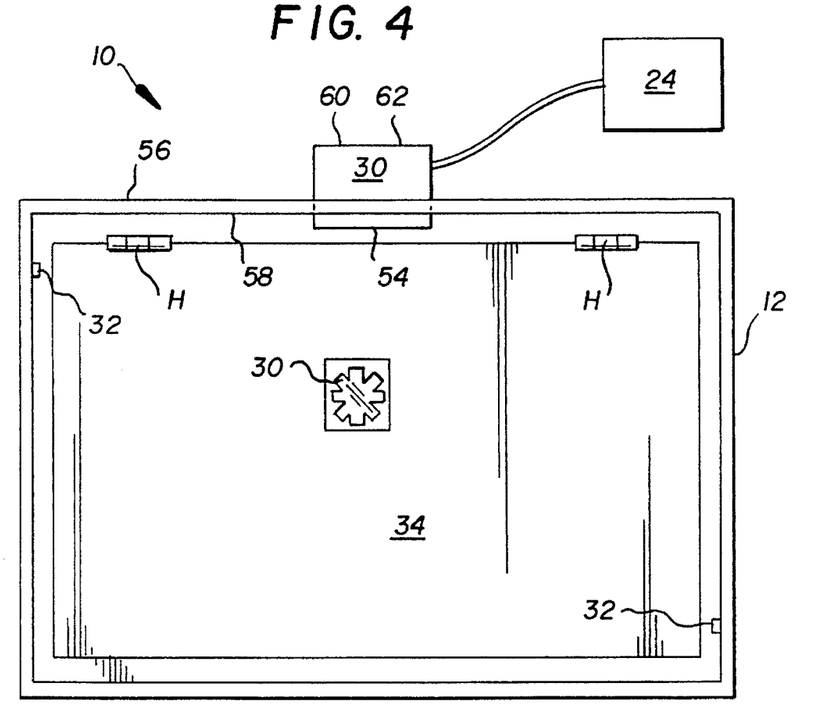
FIG. 4 is a top view of the inventive check-out vessel with the item receiving door removed, revealing the tag slot, the display means scanning device, the micro-processor wired to the scanning device, and the item releasing door mounted on hinges H, which is a less preferred alternative to sliding in edge grooves.
Figure 5:
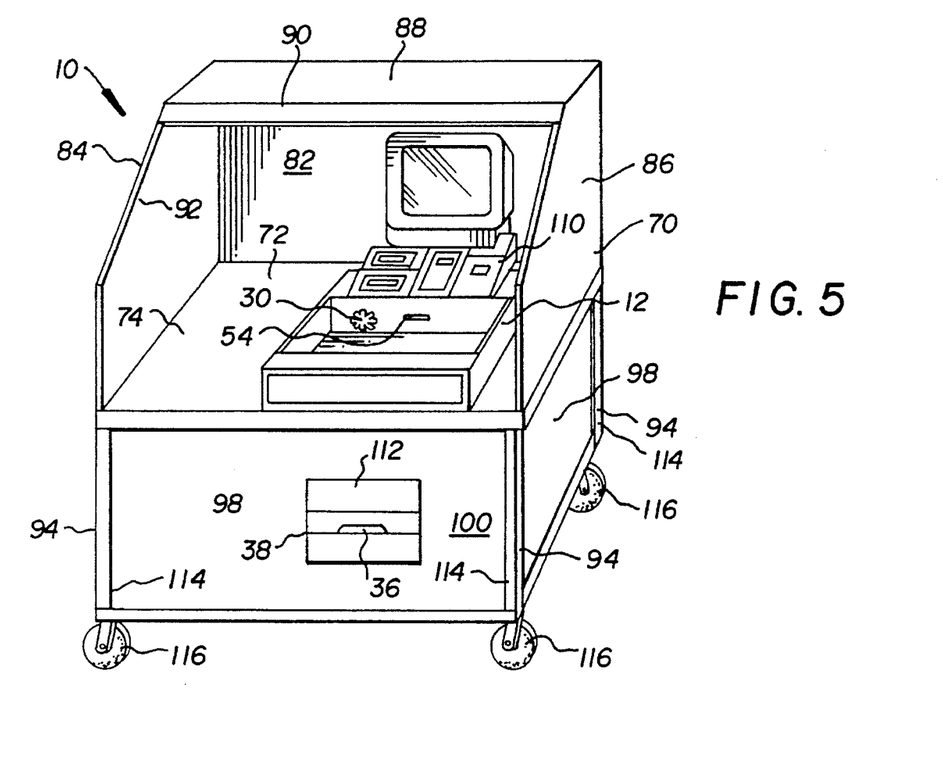
FIG. 5 is a perspective view of the first embodiment of the inventive check-out table having the roll-down top and automatic bagging apparatus contained below the table top.
Figure 6:
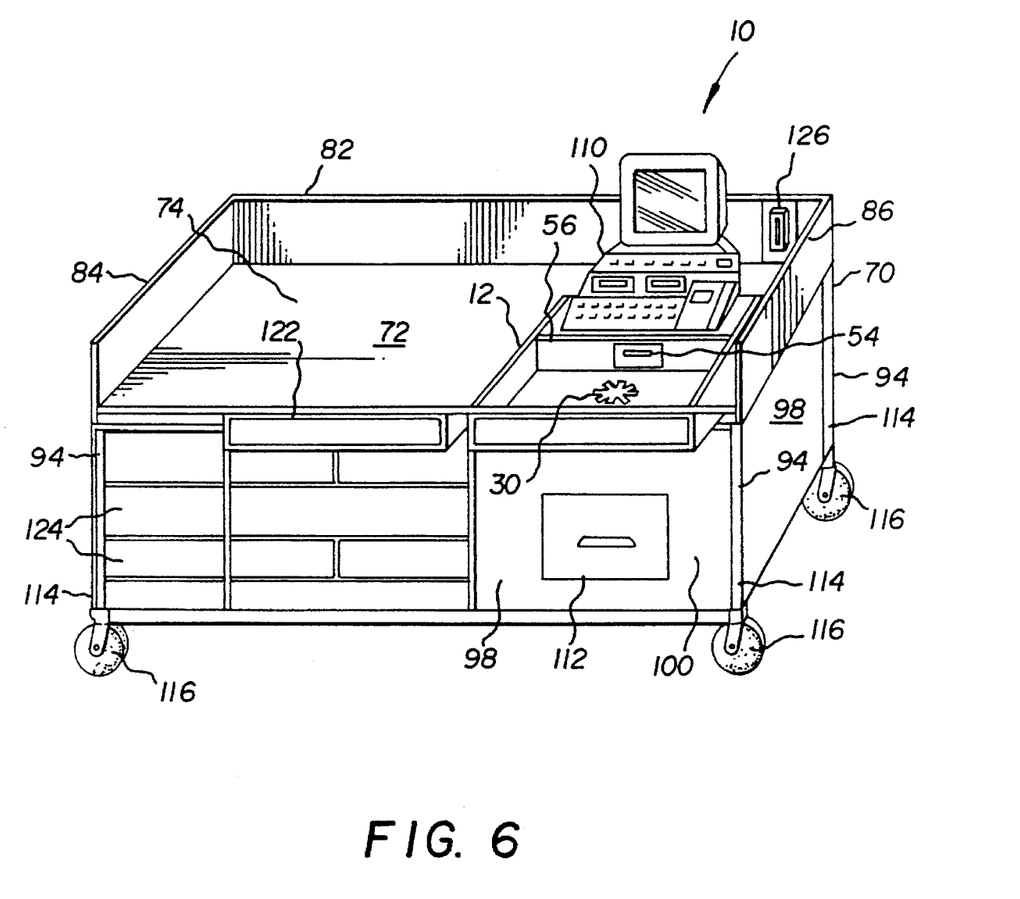
FIG. 6 is a perspective view of the second embodiment of the inventive check-out table having the roll-down top and automatic bagging apparatus contained below the table top. A register drawer, shelves and a telephone are additionally provided, as shown.
Figure 7:
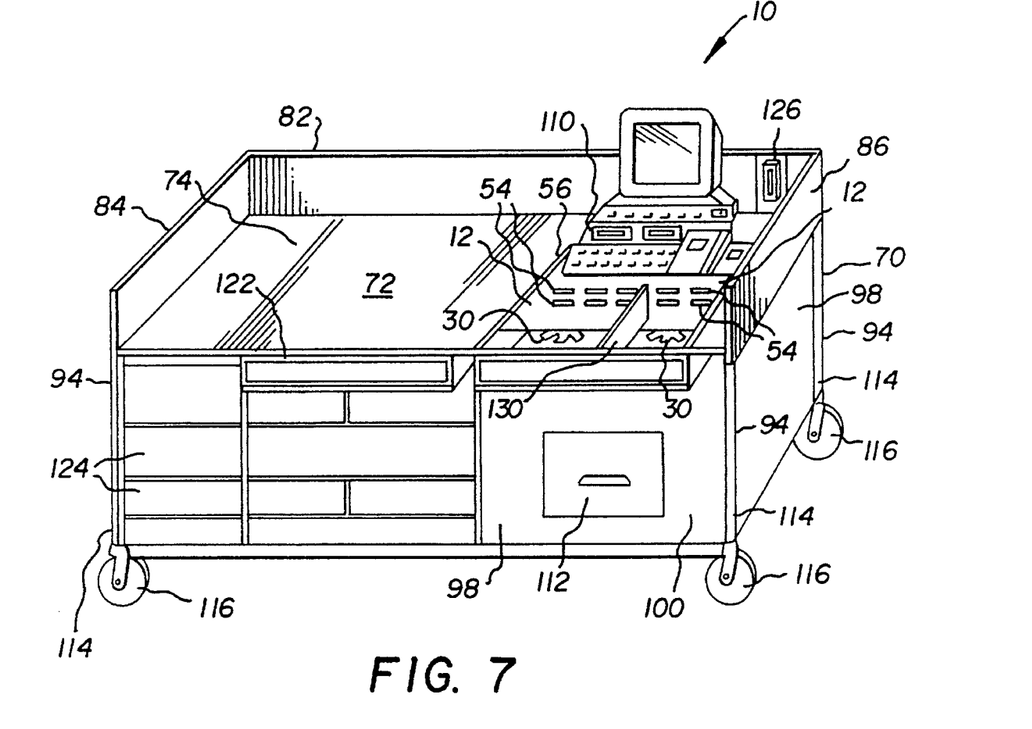
FIG. 7 is a view as in FIG. 6 of the second embodiment of the inventive check-out table, but having several tag slots.
Figure 8:
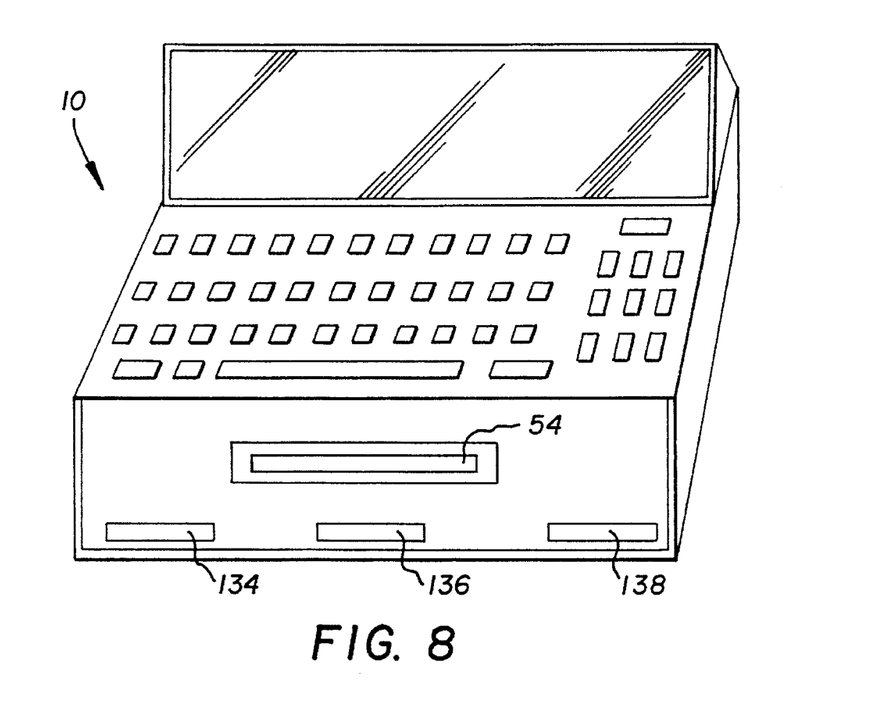
FIG. 8 is a perspective view of a preferred portable version of the inventive check-out apparatus, including a battery power supply, memory, connection port to a microprocessor.

A variation of the table 70 of FIG. 6 is illustrated in FIG. 7, where several tag slots 54 are provided in vessel 12 to permit checking of several items 14 at once. Also, an X-ray generator 132 or ultrasound generator 142 or microwave generator 144 may be provided to enable scanning of the display means 16 in the form of bar codes 44 printed with an ink containing a dye or additive such as barium to obtain a clearly contrasting code image for several items 14 at once. See U.S. patent application Ser. No. 08/328,683, filed on Oct. 25, 1994. In this instance protective shielding is provided around vessel 12 walls and doors 22 and 34. Vessel 12 may also be divided into two (or more) compartments by a divider wall 130, thereby providing multiple vessels 12, as shown in FIG. 7. Multiple vessels 12 may be used to separate different types, shapes or sizes of items 14, or to provide different types of scanning devices 30 for different types of display means 16.

A payment receiving device (not shown) is preferably provided just below the monitor screen of the cash register. The payment receiving device may take the form of a slot for receiving a credit card or a debit card, and means adjacent the slot for reading the card, or a slot for receiving a check or cash. Many types of purchase items 14 checked with apparatus 10, including but not limited to grocery items, clothing, footwear, cosmetics, electronics, accessories, drugstore items, hardware and general retail merchandise items.

As mentioned at the beginning of this section, apparatus 10 is suitable for either customer self check-out or for conventional store employee operated check-out. Where apparatus 10 is used as a store employee operated check-out, the store may be equipped with many check-out counters which includes apparatus 10, but with fewer cashiers because of the versatility of the equipment. A single store employee may be responsible for more than one apparatus 10, and yet still be freed to spend more time doing other duties such as keeping merchandise orderly, assisting shoppers in selecting items, and generally helping the store generate more business. This is because the store employee does not have to: spend time in searching for the tag 40 because it is universal and easy to find by its common shape; does not have to search for different tag alarms and use different equipment to remove and store the tags, as is done presently; does not have to scan items 14 and move them to another side of the check-out counters as is done currently; and when finished, does not have to handle each item 14 again and place items 14 in different bags 36, and does not have to staple the receipt onto the bag 36. These complex and time consuming procedures are replaced by one single and simple one.

An apparatus 10 at a check-out counter can be switched to the self-check mode to automatically self-check shoppers or to the conventional employee-check mode with the help of a store employee. In the latter instance, doors 22 and 34 may remain in an open position during checking to facilitate the rapid check of items 14 by introducing tags 16 into slots 54, while items 14 are already resting in an open bag 36. Bag 36 is sealed automatically when full. The type of tag 40 used might depend on the value of the purchase item 14. A very simple and inexpensive version of tag 40 containing the item data only in the form of a bar code 44 may be used for inexpensive items 14, such as for T-shirts. A tag 40 with a magnetic strip 46 and a dye-filled engaging member 52 might be used for medium priced items 14 and an elaborate tag 40 with microprocessor 24 chip and electric alarm 28 could be attached to a high priced item 14. The elaborate tags 40 might display advertising messages in information display panels 96.

A portable apparatus 10 may be provided to read and write data stored in item 14 information display means 16, the equipment including a printer (not shown) for printing bar codes 44 and for printing other data such as item 14 price, size and color on an adhesive sticker. See FIG. 8. The portable apparatus 10 preferably includes means for dispensing such adhesive stickers and means for sticking them onto tag bodies 42 in an appropriate location. Additional preferred features include a power supply 134 such as a solar cell and a battery, machine readable memory 136, a terminal connector 138 for connection to a microprocessor, means for separating tag bodies 42 from items 14 without triggering alarm 28, and means for issuing new tag bodies 42 if required. The portable apparatus 10 is of a size, weight and configuration suitable for movement around a store with a store employee and for connection to a main computer through the portable equipment machine readable memory and/or through a radio frequency, to permit the checking of items 14 inside the store. This checking includes reading data stored in each tag 40 information display means 16, modifying stored data in the event of a sale or other changes in item 14 prices as business may require.

Method

In practicing the invention, the following method may be used. The tag 40 on a given item 14 is inserted into tag receiving slot 54 and the item 14 is itself placed in its entirety into the vessel 12. Upon closing of item receiving door 22, the item 14 price and any other recorded item 14 data is scanned by scanning device 30. Then the tag exit alarm triggering means is deactivated by scanning device 30. Triggering means deactivation may require that scanning device 30 depress control wires 64 retained within narrow inconspicuous passageways 66 in the tag body 42, passageways 66 opening as small ports 68 in the end of tag body 42 opposite elongate item engaging member 52. Other deactivation mechanisms and procedures are contemplated. Then scanning device 30 also mechanically cuts the engaging member 52 and removes and securely stores the tag 40, which may be reused. Alternatively the tag security mechanism is merely deactivated and the tag 40 remains on the purchase item 14 for removal from the store.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A customer check-out apparatus for recording the prices of purchase items where said purchase items each have an item information display means for storing purchase item data including purchase item price in machine readable form, comprising:

an item check-out vessel for receiving each of said purchase items, and for checking each said purchase item, said vessel comprising a vessel wall and an item receiving door for opening to admit a given said purchase item into said vessel and for closing to secure said item against tampering during item check-out, a purchase item display means scanning device for reading item data from said information display means on each said item upon closing of said item receiving door, a microprocessor for receiving and processing and storing data scanned by said display means scanning device.

2. An apparatus according to claim 1, wherein said purchase item comprises exit alarm triggering means for activating a store exit alarm if not checked, and wherein said display means scanning device comprises means for deactivating said exit alarm triggering means upon reading said item data.

3. An apparatus according to claim 2, wherein said display means scanning device comprises means for replacing item data deleted from said information display means.

4. An apparatus according to claim 1, wherein said vessel additionally comprises means for removing said display means from each said item during check-out.

5. An apparatus according to claim 1, wherein said vessel comprises locking means for locking said item receiving door for preventing a customer from switching purchase items during check-out.

6. An apparatus according to claim 1, additionally comprising vessel alarm means for detecting the introduction of more than one said purchase item into said vessel at a time.

7. An apparatus according to claim 1, additionally comprising an item releasing door for releasing a purchase item from said vessel after scanning of said display means.

8. An apparatus according to claim 7, additionally comprising a shopping bag and shopping bag retaining means beneath said vessel for receiving items released from said vessel through said item releasing door.

9. An apparatus according to claim 1, wherein said information display means comprises a data tag having a tag body and including a data retaining means, an elongate item engaging member for securing said tag to one of said purchase items, and wherein said display means scanning device comprises a tag receiving slot in said vessel wall for receiving and retaining said tag during scanning of said data retaining means.

10. An apparatus according to claim 1, additionally comprising means for detaching said tag from said item.

11. An apparatus according to claim 1, additionally comprising a check-out table, said check-out table comprising a table top surface area having table top edges, onto which said vessel is secured, table top area adjacent to said vessel on which said purchase items are placed while awaiting check-out.

12. An apparatus according to claim 1, wherein said vessel retains a plurality of said purchase items simultaneously, said apparatus comprising a plurality of said purchase item display means scanning devices for reading item data from said information display means of several said purchase items substantially simultaneously upon closing of said item receiving door.

13. An apparatus according to claim 1, additionally comprising means for receiving and recording customer payments prior to release of checked purchase items.

14. A method of checking purchase items using a customer checkout apparatus for recording the prices of purchase items where said purchase items each have an item information display means for storing purchase item data including purchase item price in machine readable form comprising an item check-out vessel for receiving each of said purchase items, and for checking each said purchase item, said vessel comprising a vessel wall and an item receiving door for opening to admit a given said purchase item into said vessel and for closing to secure said item against tampering during item check-out, a purchase item display means scanning device for reading item data from said information display means on each said item upon closing of said item receiving door, and microprocessing means for receiving and processing and storing data scanned by said display means scanning device, comprising the steps of:

placing said purchase item and the attached information display means into said check-out vessel, closing said item receiving door, scanning said information display means, and releasing said item from said vessel.

15. A portable customer check-out apparatus for recording the prices of purchase items where said purchase items each have an item information display means for storing purchase item data including purchase item price in machine readable form, comprising:

a portable item check-out assembly for checking each of said purchase items, said assembly comprising an assembly wall, a purchase item display means scanning device for reading item data from said information display means on each said item, wherein said information display means comprises a data tag having a tag body and including a data retaining means, an elongate item engaging member for securing said tag to one of said purchase items, and wherein said display means scanning device comprises a tag receiving slot in said assembly wall for receiving and retaining said tag, wherein said tag receiving slot comprises tag removal means.

* * * * *